United States Patent
Yamada et al.

[11] Patent Number: 5,945,801
[45] Date of Patent: Aug. 31, 1999

[54] DRIVE CIRCUIT FOR SWITCHED RELUCTANCE MOTOR

[75] Inventors: Kenji Yamada, Aichi; Tadashi Ashikaga, Nagoya; Yoshihiro Murai, Gifu, all of Japan

[73] Assignee: Kabushiki Kaisha Meidensha, Tokyo, Japan

[21] Appl. No.: 09/154,470

[22] Filed: Sep. 16, 1998

[30] Foreign Application Priority Data

Sep. 29, 1997 [JP] Japan .................................. 9-262976

[51] Int. Cl.$^6$ ...................................................... H02P 7/05
[52] U.S. Cl. .......................................... 318/701; 318/254
[58] Field of Search .................................. 318/138, 254, 318/439, 701

[56] References Cited

U.S. PATENT DOCUMENTS

| | | | |
|---|---|---|---|
| 3,560,817 | 2/1971 | Amato | 318/701 |
| 3,697,840 | 10/1972 | Koch | 318/138 |
| 4,253,053 | 2/1981 | Ray et al. | 318/701 |
| 4,684,867 | 8/1987 | Miller et al. | 318/701 |
| 5,115,181 | 5/1992 | Sood | 318/701 |
| 5,689,164 | 11/1997 | Hoft et al. | 318/701 |
| 5,821,723 | 10/1998 | Kim | 318/701 |

FOREIGN PATENT DOCUMENTS 28 13 784  11/1978  Germany .

OTHER PUBLICATIONS

Cho, J. G. et al., "Novel Zero Voltage Transition PWM Multi-phase converters" IEEE 0-7803-3044, Jul. 1996, pp. 500-506.

Oh, S. G. et al., Elecytromagnetic Energy Recovery in SRM System IEEE 0-7803-2775, Jun. 1996, pp. 90-95.

*Primary Examiner*—Bentsu Ro
*Attorney, Agent, or Firm*—Foley & Lardner

[57] ABSTRACT

In a drive circuit for a switched reluctance motor, a DC power supply is provided, a plurality of main circuit switching devices cause branched currents from a current derived from the DC power supply to flow through stator windings of the switched reluctance motor sequentially during their turned on states; a plurality of freewheel diodes are provided, each connected across a corresponding one of the main circuit switching devices in a reverse parallel connection; a plurality of reverse flow blocking diodes are provided, each cathode of which is connected to an output end of the corresponding one of the main circuit switching devices; a resonance purpose capacitor is provided whose one end is connected to a plus terminal of the DC power supply via a resistor and whose other end is connected to an anode of each reverse flow blocking diode; a serial circuit is connected across the resonance purpose capacitor and is constituted by a resonance purpose inductor and a resonance purpose switching device for causing the resonance purpose inductor and capacitor to be resonated when turned on at a time point at which it comes near an end of a turn on interval of time of each main circuit switching device; and a bypass diode is provided whose anode is connected to a minus terminal of the DC power supply and whose cathode is connected to the one end of the resonance purpose capacitor.

7 Claims, 6 Drawing Sheets

MODE 1, MODE 2

MODE 3, MODE 4

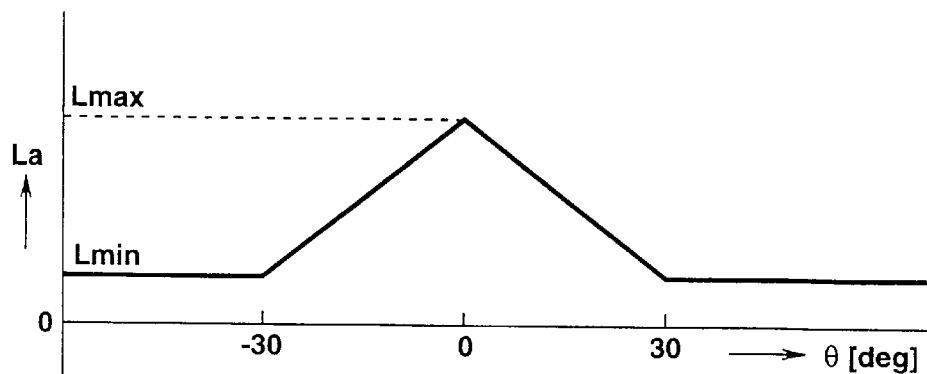
FIG.8A
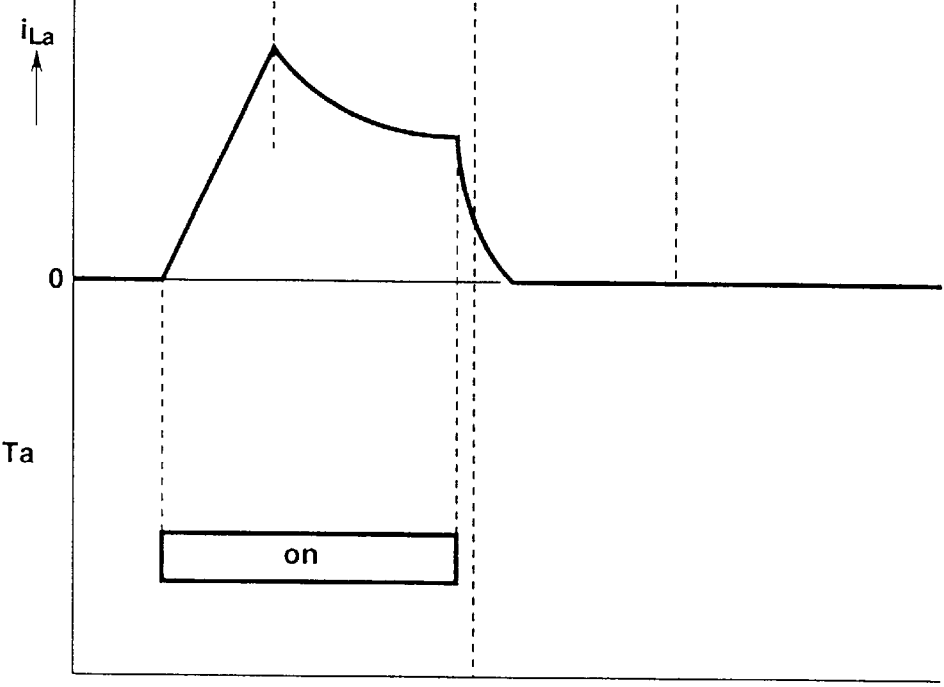
FIG.8B
FIG.8C

DRIVE CIRCUIT FOR SWITCHED RELUCTANCE MOTOR

BACKGROUND OF THE INVENTION:

a) Field of the Invention

The present invention relates to a driving circuit for a switched reluctance motor.

b) Description of the Related Art

Recently, a switched reluctance motor (hereinafter, often referred simply to as SRM) has been developed.

A rotor of the SRM is constituted by a lamination of silicon steel plates and its outer peripheral surface is formed with a plurality (for example, four) of salient poles.

On the other hand, a stator of the SRM is provided with a plurality (for example, six) of salient poles along its inner peripheral surface on which respective windings are wound is a lump manner. When the windings are sequentially energized, each salient pole of the stator on which the corresponding winding is wound attracts the adjacently facing one of the salient poles of the rotor to develop a torque on the rotor.

FIG. 1 shows a general concept of the SRM.

In FIG. 1, the rotor 1 to be revolved in the direction of n is provided with four salient poles 1a, 1b, 1c, and 1d on its peripheral surface. It is noted that three windings 2a, 2b, and 2c are wound on the salient poles (not shown) of the rotor of the SRM.

A current caused to flow through each phase of the windings 2a, 2b, and 2c is switched by means of switching devices so that developed magnetic fluxes thereon are moved sequentially in a rotation direction of the rotor, thus the rotor 1 being revolved.

FIG. 2 shows a graph indicating a variation in a whole inductance La of the one winding 2a of the stator of the SRM shown in FIG. 1 with respect to a revolution angle θ of the rotor 1. It is noted that when the winding 2a on one of the salient poles of the stator has just faced against the two symmetrically arranged salient poles 1a and 1c, the revolution angle θ indicates zero.

An industry demands a drive circuit for the SRM which can improve a circuit efficiency, can solve a problem of electromagnetic wave interference, and can increase more an output torque of the SRM.

SUMMARY OF THE INVENTION

It is therefore an object of the present invention to provide a drive circuit for the SRM which can meet the industrial demand described in the BACKGROUND OF THE INVENTION and can improve an efficiency of the drive circuit without loss of an advantage in the drive circuit using a resonance circuit.

According to one aspect of the present invention, there is provided with a drive circuit for a switched reluctance motor, comprising:

a DC power supply;

a plurality of main circuit switching devices for causing branched currents from a current derived from the DC power supply to flow through stator windings of the switched reluctance motor sequentially during their turned on states;

a plurality of freewheel diodes each connected across a corresponding one of the main circuit switching devices in a reverse parallel connection;

a plurality of reverse flow blocking diodes, each cathode of which is connected to an output end of the corresponding one of the main circuit switching devices;

a resonance purpose capacitor whose one end is connected to a plus terminal of the DC power supply via a resistor of a given resistance value and whose other end is connected to an anode of each reverse flow blocking diode;

a serial circuit connected across the resonance purpose capacitor and which is constituted by a resonance purpose inductor and a resonance purpose switching device for causing the resonance purpose inductor and capacitor to be resonated when turned on at a time point at which it comes near an end of a turn on interval of time of each main circuit switching device; and a bypass diode whose anode is connected to a minus terminal of the DC power supply and whose cathode is connected to the one end of the resonance purpose capacitor.

BRIEF DESCRIPTION OF THE DRAWINGS

FIGS. 8A, 8B, and 8C are integrally a characteristic graph representing winding current flowing through each stator winding (notably, the first phase stator winding) and switching time duration with respect to the variation in the inductance of each stator winding according to the revolution angle as shown in FIG. 2 in the case of the preferred embodiment shown in FIG. 3.

BEST MODE FOR CARRYING OUT THE INVENTION

Before explaining the present invention, first and second comparative example of a drive circuit for a switched reluctance motor (SRM) will be described below.

The first comparative example to the drive circuit for the SRM in a preferred embodiment according to the present invention includes: a) a DC power supply generally denoted by E; b) a pair of first and second semiconductor switching devices generally denoted by Ta and Tb, an emitter of the first switching device Ta being connected to a collector of the second switching device Ta via the first phase winding 2a of the stator of the SRM, the collector of the first switching device Ta being connected to a plus terminal of the DC power supply E, and the emitter of the second switching device Td being connected to a minus terminal of the DC power supply E; c) a first freewheel diode generally denoted by Da whose cathode is connected to the plus terminal of the DC power supply E and whose anode terminal of the DC power supply is connected to the collector of the second switching device Td; and d) a second freewheel diode generally denoted by Dd whose anode terminal is connected to the minus terminal of the DC power supply E and whose cathode is connected to the emitter of the first switching device Ta. It is noted that the first winding 2a has an equivalent circuit of an inductance La and serially connected resistance Ra.

It is also noted that, for a second phase winding generally denoted by 2b, a pair of third and fourth semiconductor switching devices Tb and Te having the same connection relationship as the pair of the first and second switching devices Ta and Td described above and a pair of third and fourth freewheel diodes Db and De have the same connection relationship as the pair of the first and second freewheel diodes Da and Dd.

It is also noted that, for the third winding 2c of the stator of the SRM, a pair of fifth and sixth semiconductor switching devices generally denoted by Tc and Tf have the same connection relationship as the pair of the first and second switching devices Ta and Td and a pair of fifth and sixth freewheel diodes generally denoted by Dc and Df have the same connection relationship as the pair of the first and second freewheel diodes Da and Db.

It is also noted that the second phase winding 2b has the same equivalent circuit having the inductance Lb and the serially connected resistance Rb and the third phase winding 2c has the same equivalent circuit to the inductance Lc and the serially connected resistance Rc.

Hence, when the switching operation is carried out for the pairs of the first to sixth switching devices Ta and Td, Tb and Te, and Tc and Tf, the consecutive energizing of the first phase, second phase, and third phase stator windings 2a has the same equivalent circuit of the inductance Lc and the serially connected resistance Rc.

Figure 1:
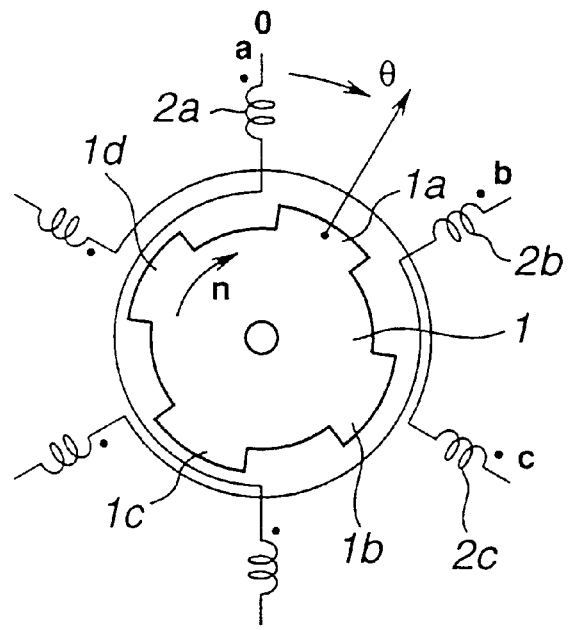
FIG. 1 is a schematic explanatory view for explaining a general concept of a switched reluctance motor (or SRM).
Figure 2:
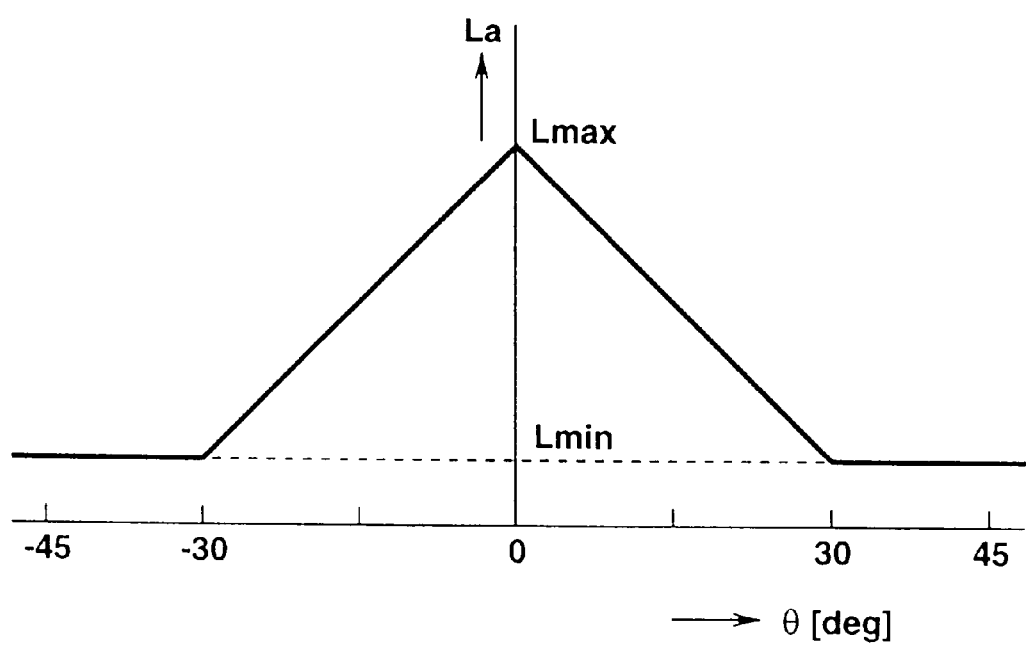
FIG. 2 is a characteristic graph representing a relationship between a revolution angle θ of the SRM shown in FIG. 1 and a reluctance in each stator winding (notably, a first phase stator winding).

Hence, when the switching operation is carried out for the pairs of the first to sixth switching devices Ta and Td, Tb and Tc, and Tc and Tf, the consecutive enegizations of the first phase, second phase, and third phase windings 2a→2b→2c→2a are carried out to enable the revolution of the rotor shown in FIG. 1.

However, since, in first comparative example of the drive circuit for the SRM, the switching devices Ta through Tf perform hard switchings, viz., the switching devices Ta through Tf perform switching operations with a voltage applied across each switching device or with a current caused to flow through each switching device, a switching loss is developed across each switching device Ta through Tf so that an efficiency in the drive circuit is reduced.

In addition, since the switching operation for each switching device Ta through Tf is the hard switching, an electromagnetic wave interference (so-called, EMI) may occur.

Furthermore, in the case where the SRM is driven, it is necessary to discuss each current to be caused to flow through the corresponding one of the first, second, and third winding 2a, 2b, and 2c, representatively through the first winding 2a.

Figure 7A:
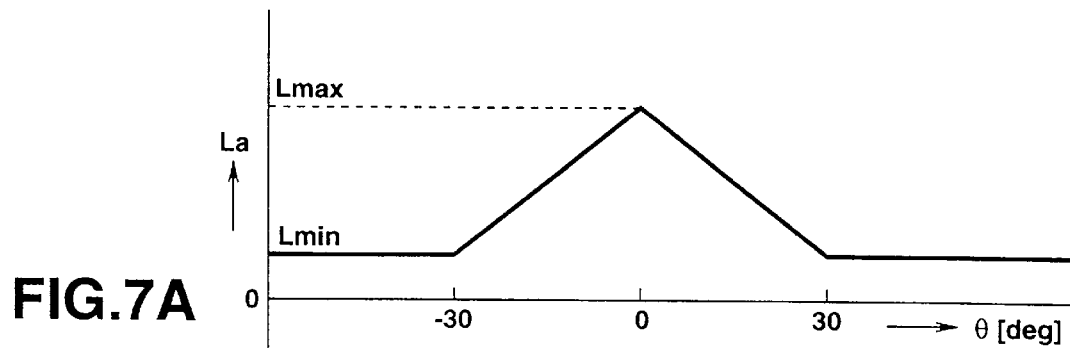
FIGS. 7A, 7B, and 7C are integrally a characteristic graph representing ideal winding current flowing through each stator winding (notably, the first phase stator winding) and switching time duration with respect to the variation in the inductance of each stator winding according to the revolution angle as shown in FIG. 2 in a case of a first comparative example.
Figure 7B:
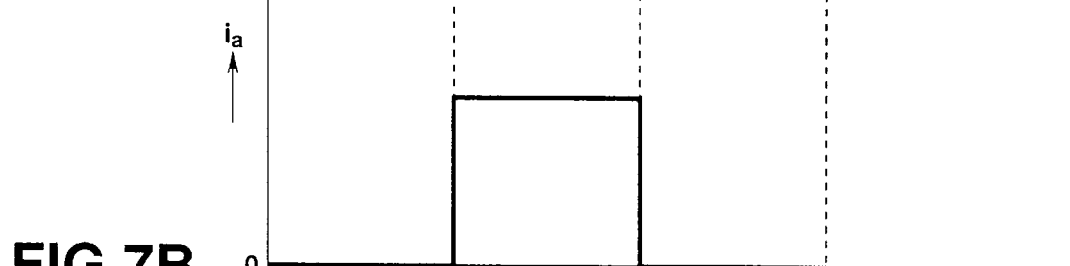
Figure 7C:
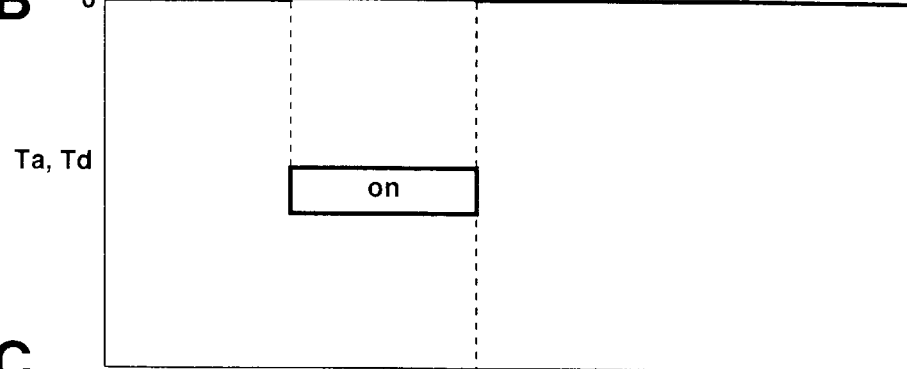

In the case where the SRM shown in FIG. 1 is driven, if a winding current ia could be caused to flow through the first phase winding 2a at a timing and a width as shown in FIGS. 7B and 7C, a maximum torque at the same current peak could be outputted and the efficiency in the drive circuit would be favorable.

However, as appreciated from FIG. 7A, the SRM has a large inductance La in each winding of the stator so that an instantaneous variation rate in the winding current ia is low.

Hence, in the first comparative example, the pair of the first and second switching devices Ta and Tb are turned to ON at an earlier timing than the ideal timing as shown in FIGS. 7B and 7C.

Consequently, with the winding current ia flowing through the first phase winding 2a approached to the ideal state as shown in FIG. 7A, the output torque is tried to enlarge at the same peak.

However, in the case where the pair of the first and second switching devices Ta and Tb are turned to OFF, the inductance of the SRM has already become large and the current hardly changes (varies, or reduces). Consequently, even if the revolution angle θ of the rotor exceeds zero degrees, the winding current ia is caused to flow through the first phase winding 2a so that a reaction drive torque (so-called, a negative torque) is outputted.

In order to avoid such an unfavorable phenomenon as described above, it is necessary to turn off the switching devices Ta and Td at a further earlier timing than the above-described turn-off timing.

However, this more further earlier timing causes the maximum output torque to be reduced.

Next, the second comparative example of the drive circuit for the SRM to that in the case of the preferred embodiment will be described below.

The second comparative example includes: a) the DC power supply E; b) main circuit switching devices generally denoted by Ta, Tb, and Tc connected in series with the respectively corresponding phase windings 2a, 2b, and 2c between the plus and minus terminals of the DC power supply E; c) first, second, and third freewheel diodes Da, Db, and Dc connected in reverse parallel to the corresponding main circuit switching diodes Ta, Tb, and Tc; d) LC resonance circuit whose one end is connected to the plus terminal of the DC power supply E via a resistor Rk whose other end is connected to one end of each winding 2a, 2b, and 2c via each corresponding reverse flow blocking diode generally denoted by Dba, Dbb, and Dbc; e) a resonance purpose switching device Tr connected in parallel to the LC resonance circuit; and f) a bypass diode Df connected between one end of the LC resonance circuit connected to the resistor Rk and the minus terminal of the DC power supply E.

The resonance purpose switching device Tr is turned on when the time approaches to an end of an on interval of each main circuit switching device Ta, Tb, and Tc and is turned off when the time approaches to the time immediately before the end of the on internal of each main circuit switching device Ta, Tb, and Tc.

While the resonance purpose switching device Tr is turned off, the resonance purpose capacitor Cr is charged so that a terminal voltage at the resistor side Rk indicates a positive polarity by means of the DC power supply E.

When the switching device Tr is turned on, a closed circuit constituted by the inductance Lr and the capacitor Cr is formed. Due to a discharge from the capacitor Cr, a resonance circuit is caused to flow in the closed circuit so that the capacitor Cr is finally charged with a reverse polarity. Then, the switching device Tr is turned off with a zero ampere state of no resonance current flow.

When the switching device Tr is turned off, the charged voltage of the capacitor in the reverse direction causes the current to flow into the freewheel diodes Da through Dc via the inductor Lr and the diodes Dba, Dbb, and Dbc. Immediately after the switching device Tr is turned off, the main circuit switching device, for example, Ta is turned off in the zero voltage state. Hence, no switching loss occurs during the off state of each main circuit switching device so that the circuit efficiency is improved and the EMI does not occur.

When the main circuit switching device Ta is turned off, the current iLa flowing through the winding 2a is continued to flow therethrough. However, since the main circuit switching device Ta is turned off, the current is caused to flow in a route (locus) from the diode Df, the serial L-C resonance circuit of the capacitor Cr and the inductor Lr, and the diode Dba. At this time, the winding current iLa is abruptly decreased since the capacitor Cr, the inductance Lr, and the inductance La constitute the resonance circuit.

In addition, since the winding current iLa is abruptly decreased to zero flowing at an interval of time the revolution angle θ exceeds zero degrees, the reaction drive torque (the negative torque) is remarkably reduced.

The drive circuit using the resonance circuit (the second comparative example) increases the torque together with eliminating the switching loss and electromagnetic wave interference (EMI).

The current outputted from the resonance circuit to the main circuit switching devices is caused to flow into the resonance purpose inductor of the resonance circuit and, therefore, the efficiency of the drive circuit is reduced. This is disadvantageous in the second comparative example. It is noted that the second comparative example is described in an English paper of IEEE-IAS submission published on Jun. 22, 1997 at the earliest and titled "New Soft-Switched Reluctance Motor Drive Circuit" authored by Yoshihiro Murai.

Figure 3:
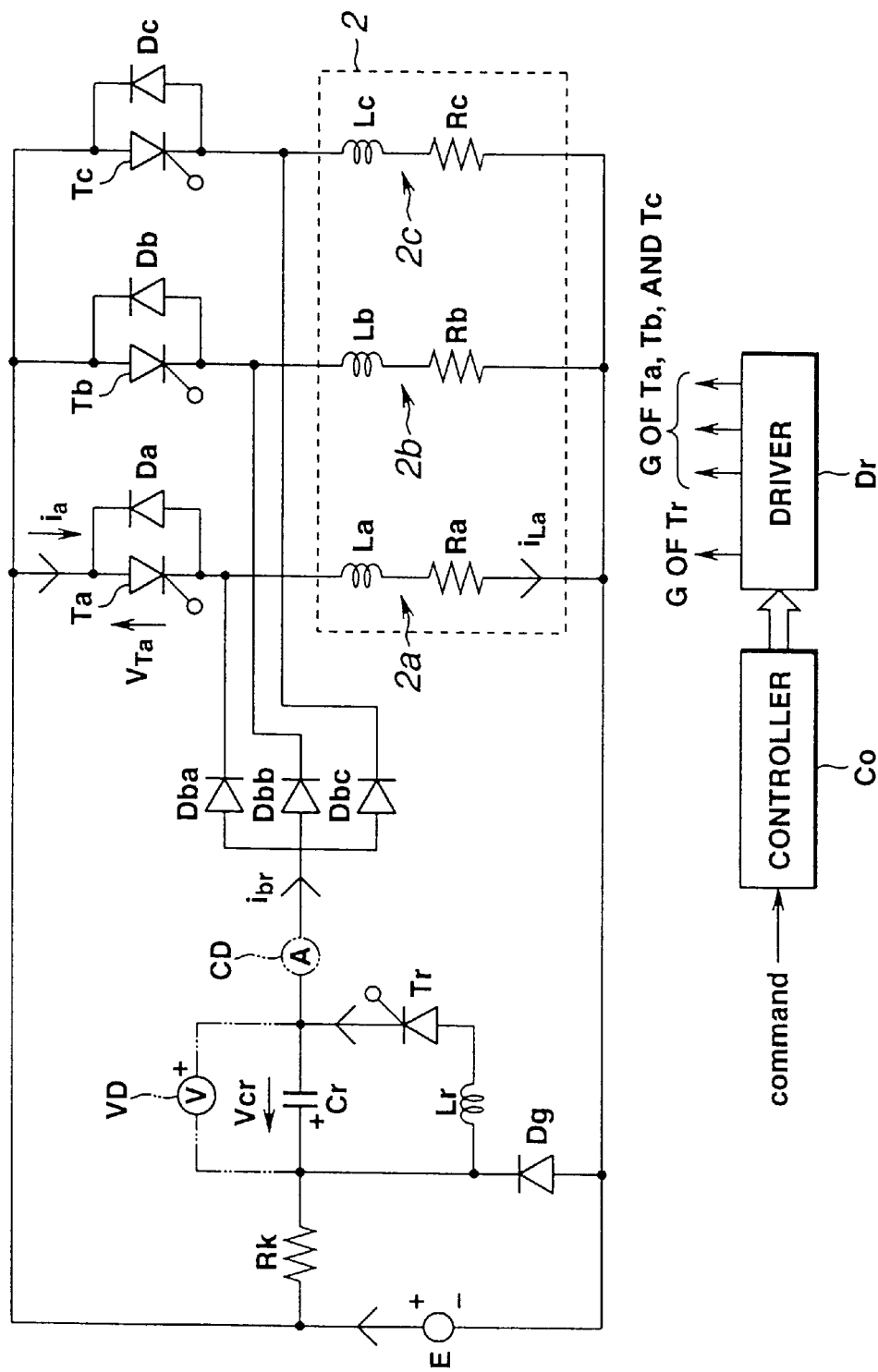
FIG. 3 is a circuit wiring-and-block diagram of a drive circuit for the SRM in a preferred embodiment according to the present invention.

Next, FIG. 3 shows the circuit configuration of the drive circuit for the SRM in a preferred embodiment according to the present invention.

In FIG. 3, the drive circuit in the preferred embodiment includes: a) a DC power supply E; b) main circuit switching devices Ta, Tb, and Tc of self de-arcing types, viz., each of which is turned on-and-off between output terminals, i.e., the collector and emitter thereof in accordance with an on-and-off of its input signals, i.e., c) a plurality of stator windings 2a, 2b, and 2c connected in series with the respectively corresponding main circuit switching devices Ta, Tb, and Tc; d) the resonance purpose capacitor Cr; e) a resonance purpose inductor Lr connected to one end of the resonance purpose capacitor Cr; f) a resonance purpose switching device Tr of the self de-arcing type connected in series with the other end of the resonance purpose capacitor Cr and the inductor Lr; and g) the bypass diode Dg connected between the minus terminal of the DC power supply E and a junction between the resistor Rk and the one end of the resonance type capacitor Cr.

The one end of the capacitor Cr is connected to the plus terminal of the DC power supply E via the current limiting resistor Rk and the other end of the capacitor Cr is connected to each junction between the main circuit switching devices Ta, Tb, and Tc and the respectively corresponding windings 2a, 2b, and 2c.

Figure 4:
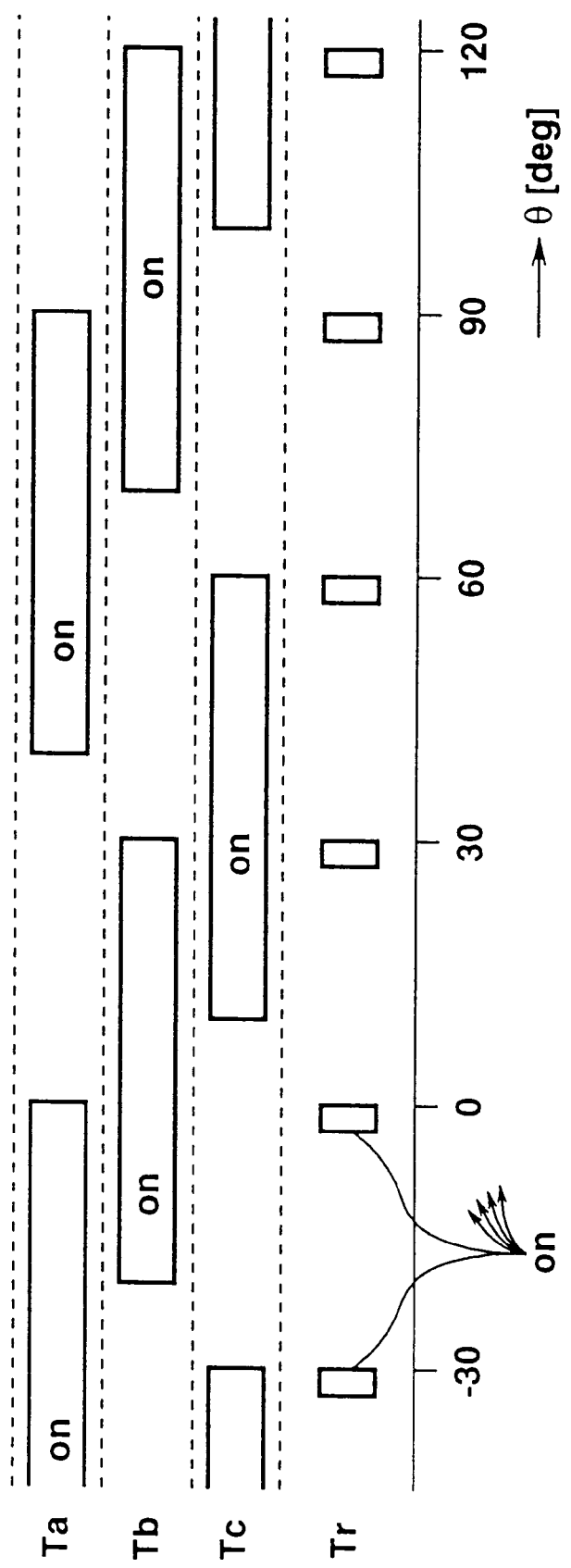
FIG. 4 is a timing chart for explaining turn on and turn off states of each switching devices Ta, Tb, Tc, and Tr shown in FIG. 3.

The main circuit switching devices Ta, Tb, and Tc and resonance purpose switching devices Tr in the embodiment shown in FIG. 3 are turned on and off at timings shown in FIG. 4.

The switching operations of the drive circuit shown in FIG. 3 will be described with the first phase of a (the phase in a system of the one main circuit switching device Ta and of the one of the stator winding 2a).

It is noted that the switching operation for the other phases of b and c are generally the same as the first phase of a except the timings thereof are deviated. Hence, those operations for the other phases of b and c will be omitted.

First, when the main circuit switching device Ta is turned off, the resonance purpose capacitor Cr has the one end connected to the current limiting resistor Rk and which is charged with the plus polarity. The current does not flow through the winding 2a of the SRM. The charged voltage of the resonance purpose capacitor Cr indicates Vcr. It is noted that each phase stator winding 2a(, 2b, and 2c) has an equivalent circuit constituted by the inductance La, (Lb and Lc) and the serially connected resistance Ra, (Rb, and Rc).

[Mode 1]

When the main circuit switching device Ta is turned on, the winding current iLa generated by the DC power supply E is caused to flow into the winding 2a of the SRM. At this time, before a time point at which the switching device Ta has been turned on, the current is not caused to flow through the switching device Ta. Hence, the switching device Ta is turned on with the current zeroed, namely, under a, so-called, zero ampere switching state.

In addition, in the mode 1, the reverse flow blocking diode Dba is in the reverse flow blocking state, namely, in the turned off state. An output current ibr flowing through the resonance purpose capacitor Cr is zeroed.

[Mode 2]

When it comes near to the end of the ON time interval of the main circuit switching device Ta, the resonance purpose switching device Tr is turned to ON (refer to FIG. 4). A closed circuit is formed by the resonance purpose switching device Tr, the resonance purpose inductor Lr, and the resonance purpose capacitor Cr.

Figure 5:
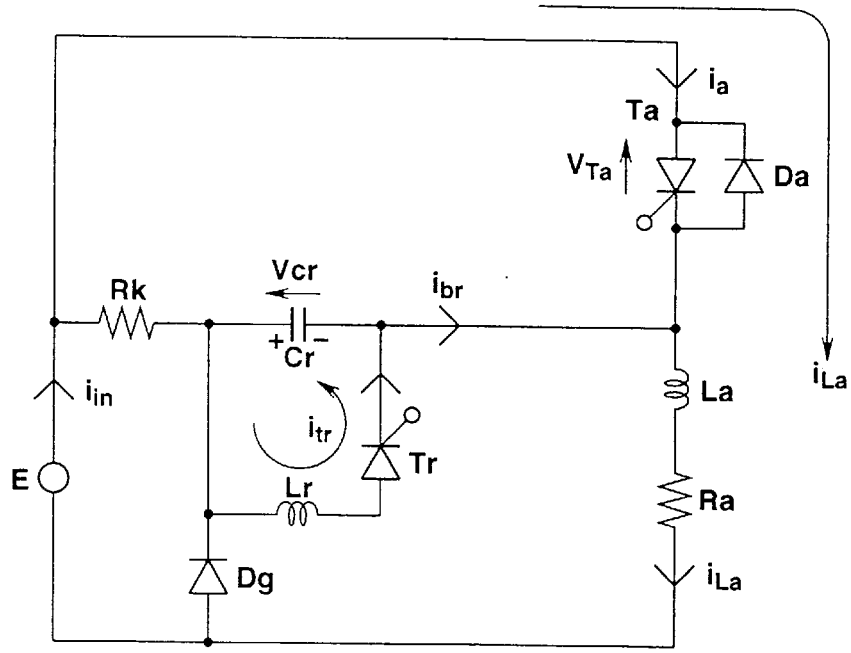
FIG. 5 is an explanatory view for explaining current flows in the drive circuit shown in FIG. 3 in a mode 1 and a mode 2.

As shown in FIG. 5, the resonance circuit itr is caused to flow in the closed circuit. When the resonance circuit itr is caused to flow in the closed circuit, the charged polarity of the resonance purpose capacitor Cr is gradually changed from the positive polarity to the reverse polarity. At a final stage, the charged polarity of the resonance purpose capacitor Cr indicates the negative polarity at the one end thereof connected to the current limiting resistor Rk and indicates the positive polarity at the other end thereof connected to the reverse blocking diode Dba so that the capacitor Cr indicates the reverse polarity.

Then, when no resonance current itr is not caused to flow, namely, when the resonance purpose capacitor Cr is completely charged with the reverse polarity, the resonance purpose switching device Tr is turned off.

It is noted that in a case where the resonance purpose switching device Tr is constituted by a thyristor, the resonance purpose switching device Tr is self arc extinguished and is turned off (turned off in the self de-arcing mode) at a time when the resonance current itr is not caused to flow.

In the mode 2, the resonance purpose switching device Tr can be turned on under the zero ampere switching condition and can be turned off under the zero ampere switching condition.

[Mode 3]

When the resonance purpose switching device Tr is turned off in the mode 2 or is caused to be turned off, the mode is transferred from the mode 2 to a mode 3.

Figure 6:
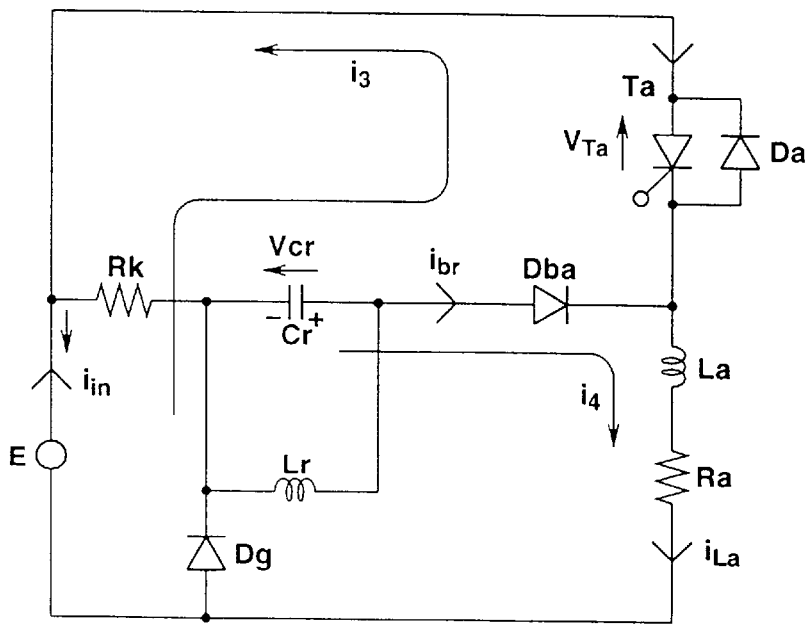
FIG. 6 is another explanatory view for explaining current flows in the drive circuit shown in FIG. 3 in a mode 3 and a mode 4.

In the mode 3, the current i3 is caused to flow by means of the voltage charged in the capacitor Cr with the reverse polarity. Namely, as shown in FIG. 6, the current i3 is caused to flow in such a route (locus) as the resonance purpose capacitor Cr→ the reverse flow blocking diode Dba →the freewheel diode Da of the main circuit switching device Ta.

At this time, since the current i3 flows through the freewheel diode Da, a voltage VTa across the main circuit switching device Ta indicates zero.

In this state, the switching device Ta is turned off. Hence, the main circuit switching device Ta can be turned off under zero applied voltage across the collector- emitter thereof (,i.e., zero voltage switching).

Consequently, the main circuit switching device Ta can be turned off in the zero voltage switching. In other words, since the soft switching can cause the main circuit switching device Ta to be turned off, no switching loss occurs even if the main circuit itself Ta is turned off and the circuit efficiency can be improved with no EMI problem.

In addition, since the current i3 is not caused to flow through the resonance purpose inductor Lr, no loss due to the presence of the inductor Lr occurs.

[Mode 4]

When the main circuit switching device Ta is turned off in the zero voltage switching, the mode is transferred from the mode 3 to a mode 4.

In the mode 4, even after the switching device Ta is turned off, the winding current iLa is tried to be continued to flow due to the inductance La of the stator winding 2a. However, since the main circuit switching device Ta is turned off, the current i4 is caused to flow in the route shown in FIG. 6.

At this time, since the resonance circuit is formed by means of the resonance purpose capacitor Cr and the inductance La of the winding La, the current i4 is abruptly decreased. Thereafter, in the same way as the drive circuit in the second comparative example, the winding current iLa becomes extremely reduced at the time point at which the switching device Ta has been turned off. The winding current iLa becomes remarkably small during a time interval exceeding zero degree of the revolution angle θ of the rotor of the SRM.

The reaction drive torque (the negative torque) becomes remarkably reduced. In addition, the current i4 does not flow in the resonance purpose inductor Lr and no loss due to the inductor lr occurs.

[Mode 5]

After the mode 4, all currents including the winding current iLa are zeroed. This mode is called mode 5. After the pass of the mode 5, the mode is returned to be mode 0.

As described above, in the embodiment, the main circuit switching derives Ta, Tb, and Tc can be turned off due to the zero voltage switching (ZVS) and can be turned on due to the zero ampere switching (ZCS).

In this way, since such soft switchings can be achieved that all switching devices are turned on and off due to the ZVS or ZCS, the switching loss can be decreased and the electromagnetic wave interference (EMI) can be prevented.

In addition, since the currents flowing through the windings 2a, 2b, and 2c after the main circuit switching devices Ta, Tb, and Tc are turned to OFF can remarkably be reduced due to the resonance of the resonance circuit formed by the resonance purpose capacitor Cr and the inductances La, Lb, and Lc.

The reaction drive torque can remarkably be reduced. In this case, since the inductance is constituted only by that in the winding, the reduction in the current becomes furthermore earlier than the second comparative example.

The turned on-and-off states of the switching devices are shown in Table 1 during the time at which the mode is transferred from the mode 1 to the mode 5 via the mode 2, 3, and 4.

The switching loss in the circuit is eliminated.

The loss can be reduced by not caused to flow into the resonance purpose inductor in the mode 3 and in the mode 4.

TABLE 1

|            | OFF | ON  |
|------------|-----|-----|
| Ta, Tb, Tc | ZVS | ZCS |
| Tr         | ZCS | ZCS |

Since the on-and-off timing of the resonance purpose switching device Tr in the embodiment is the same as that in the case of the second comparative example, the controller can control these on-and-off timings in the same manner as those carried out in the second comparative example.

The time interval from the time at which the resonance purpose switching device Tr has been turned on to the time at which the resonance purpose switching device has been turned off, namely, the time up to which the resonance purpose capacitor Cr has completely been charged with the reverse polarity due to the resonance can be determined depending solely on circuit constants and power supply. Hence, if the time interval in the mode 2 is calculated or measured so as to be previously set, the turn off of the main circuit switching device Ta in the mode 3 at the time point at which the set time duration has been elapsed can be made from the time at which the resonance purpose switching device Tr has been turned on.

Alternatively, when a DC voltage detector may be installed across the resonance purpose capacitor Cr to detect the charge completion in the capacitor Cr with the reverse polarity, the turn off of the main circuit switching device Ta in the mode 3 may be made.

Alternatively, when a current detector may be inserted into the line between the other end of the capacitor Cr and the anode of the reverse flow blocking diode Dba, the turn off of the main circuit switching device Ta in the mode 3 may be made since the current is caused to flow from the resonance purpose capacitor Cr to the reverse flow blocking diode Dba and can be measured by the current detector.

Although, in the embodiment shown in FIG. 3, each main circuit switching device is constituted by the thyristor, at least one of the main circuit switching devices and resonance purpose switching device may be constituted by a BJT (Bi-polar Junction Transistor) or IGBT (Insulated Gate Bipolar Transistor), each of which is of the self de-arcing type.

It is noted that, as shown in FIG. 3, a controller Co is connected to a driver which issues a drive signal to each gate G of the first phase, second phase, and third phase main circuit switching devices Ta, Tb, and Tc and of the resonance purpose switching device Tr at the respective timings as described with reference to FIG. 4. As the alternatives, when the controller Co may receive the detection result of the voltage detector VD or current detector CD, the controller Co may issue the drive command to the driver Dr to turn on the respectively corresponding switching devices as described above.

It is also noted that the current limiting resistor Rk shown in FIG. 3 has a given resistance value including approximately zero.

It is also noted that the IGBT is described in the U.S. Pat. No. 5,771,164 issued on Jun. 23, 1998 (the disclosure of which is herein incorporated by reference).

What is claimed is:

1. A drive circuit for a switched reluctance motor, comprising:

a DC power supply;

a plurality of main circuit switching devices for causing branched currents from a current derived from the DC power supply to flow through stator windings of the switched reluctance motor sequentially during their turned on states;

a plurality of freewheel diodes each connected across a corresponding one of the main circuit switching devices in a reverse parallel connection;

a plurality of reverse flow blocking diodes, each cathode of which is connected to an output end of the corresponding one of the main circuit switching devices;

a resonance purpose capacitor whose one end is connected to a plus terminal of the DC power supply via a resistor of a given resistance value and whose other end is connected to an anode of each reverse flow blocking diode;

a serial circuit connected across the resonance purpose capacitor and which is constituted by a resonance purpose inductor and a resonance purpose switching device for causing the resonance purpose inductor and capacitor to be resonated when turned on at a time point at which it comes near an end of a turn on interval of time of each main circuit switching device; and a bypass diode whose anode is connected to a minus terminal of the DC power supply and whose cathode is connected to the one end of the resonance purpose capacitor.

2. A drive circuit for a switched reluctance motor as claimed in claim 1, wherein the resonance purpose inductor receives a current flow only when the resonance occurs in the resonance purpose inductor and capacitor and each of the main circuit switching devices is turned off when a current is caused to flow from the resonance purpose capacitor to the flywheel diode.

3. A drive circuit for a switched reluctance motor as claimed in claim 1, which further comprises a setter for setting a time duration from a time point at which the resonance purpose switching device has been turned on to a time point at which a charge characteristic of the resonance purpose capacitor has completely been changed from a positive polarity to a negative polarity and wherein each one of the main circuit switching devices is turned off sequentially whenever the set time duration has been elapsed.

4. A drive circuit for a switched reluctance motor as claimed in claim 2, which further comprises a current voltage detector, inserted into a line connecting between the resonance purpose capacitor and each of the reverse flow blocking diodes, for detecting a current flowing from the resonance purpose capacitor to each of the reverse flow blocking diodes and wherein each one of the main circuit switching devices is turned off sequentially upon the detection of the current flow from the resonance purpose capacitor to the reverse flow blocking diode.

5. A drive circuit for a switched reluctance motor as claimed in claim 1, wherein at least one of either each of the main circuit switching devices or the resonance purpose switching device is constituted by a self de-arcing type semiconductor switching device.

6. A drive circuit for a switched reluctance motor as claimed in claim 5, wherein the self de-arcing type semiconductor switching device is an IGBT.

7. A drive circuit for a switched reluctance motor as claimed in claim 5, wherein the self de-arcing type semiconductor switching device is a thyristor.

* * * * *